Aug. 27, 1929.                S. KERSTEN                1,725,987
ESCUTCHEON PIPE COUPLING

Filed May 14, 1926

Inventor
Samuel Kersten
George E. Mueller Atty.

Patented Aug. 27, 1929.

1,725,987

UNITED STATES PATENT OFFICE.

SAMUEL KERSTEN, OF CHICAGO, ILLINOIS.

ESCUTCHEON PIPE COUPLING.

Application filed May 14, 1926. Serial No. 109,020.

My invention relates to plumbing unions or fixtures for connecting and establishing communication between the usual water supply pipes and mixing valve or other plumbing unit having spaced inlet ports.

In running hot and cold water supply pipes through walls it frequently happens that they are offset from each other, and therefore will not line up or register with the inlet nipples of a mixing valve or other plumbing unit having standard spaced inlets. With this difficulty in mind it is the principal object of my invention to provide standard plumbing connections which will permit connection of two offset pipes or two parallel pipes with the parallel inlet nipples of a mixing valve or other plumbing fixture.

The invention also contemplates plumbing connections of this character which in addition to establishing communication between a pair of offset pipes and the inlet nipples of a mixing valve or the like, will cause the pipes to possess a truly aligned appearance.

Further, the invention provides a pipe union or nipple that will conceal the protruding end of a pipe, will offer no obstruction to interfere with cleaning or polishing of the same and at the same time surround and conceal the opening in the wall through which the pipe extends.

It is another object of the invention to provide a plumbing union or fixture capable of being used as a pipe support for hanging showers, bath room accessories and other plumbing equipment used in connection with the same.

On the drawing,—

Figure 1:
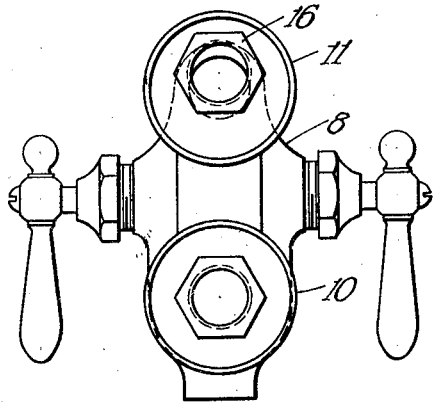
Fig. 1 is a rear elevation of a mixing valve equipped with my invention.

Referring to the drawing in detail, wherein corresponding characters of reference denote corresponding parts throughout the several views, a pair of horizontally arranged supply pipes are designated at 5 and 6 and pass through and project from a wall 7. These pipes 5 and 6, respectively, conduct hot and cold water, and it is preferable in bringing them through the wall to have them in true alignment so that they will mate or coincide with the corresponding inlet nipples of a standard mixing valve 8. However, these pipes 5 and 6 are frequently slightly offset from each other, as shown in Fig. 2, because of inaccuracies in installation, and therefore do not properly register with the inlet nipples of the mixing valve.

In order to compensate for this condition, the present invention contemplates a pair of bell-shaped escutcheon connections 10 and 11, either one or both of which are offset to take care of such non-alignment. The connection 10 has concentric, threaded opposite ends or openings 12, the inner one of which is in the form of a hexagonal boss and receives the pipe 5, and the other receives a short length of pipe or nipple 13 engaged with the lower inlet of the mixing valve 8 and held in water-tight relation thereto through the medium of a coupling nut 14.

Figure 2:
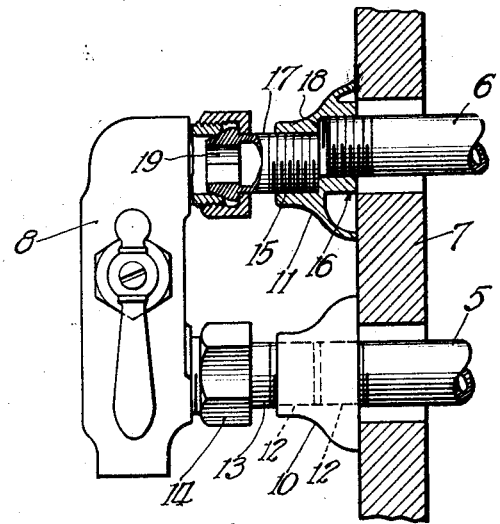
Fig. 2 is a view partly in vertical section and partly in elevation, of the same.

As illustrated in Fig. 2, the bell-shaped connection 11 is employed in connecting the pipe 6 with the remaining inlet nipple 17 of the mixing valve 8. This connection 11 is formed with a threaded bore 15 at one end and an internally-threaded, hexagonal shaped boss 16 at its opposite end surrounded or skirted by the base or flange of the nipple, is offset from the bore 15 and is to be threaded upon the projecting end of the pipe 6. This offset portion 16 thus provides a seat 18 against which the nipple 17 rests when threaded into the end 15 to prevent splitting the wall of 15 as might otherwise occur if the nipple 17 was free to be screwed in without a stop. The nipple 17 has a hexagonal inner end 19 in which a hexagon wrench is inserted for threading the nipple into the end 15 and by which the assembled elements 17—11 are screwed onto the pipe 6.

Figure 3:
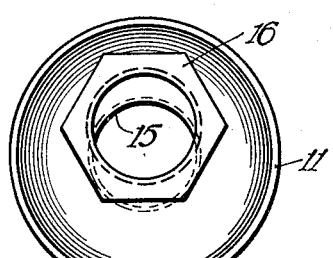
Fig. 3 is an inner face view of the adjustable nipple or connection embodied in the invention.
Figure 4:
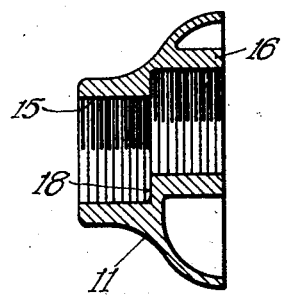
Fig. 4 is a transverse sectional view of the same.

Due to the fact that the hexagonal boss is offset from the bore 15, it will be observed that this boss 16 is arranged concentrically within the base end of the nipple 11, as illustrated in Fig. 3. Thus the boss is capable of eccentric axial adjustment. That is to say, should the pipe 6 be to one side or offset from the corresponding inlet of the valve, the offset connection 11 may be adjusted in an arc of a circle until the nipple 17 will register with the inlet of the valve.

Inasmuch as the flanges or skirts of the bell-shaped escutcheon connectors overlie the projecting ends of the pipes 5 and 6, and the external surface of the device is symmetrical, the finished job will possess the appearance of being in true vertical alignment, the bell portion also acting as an escutcheon to cover the opening in the wall.

In the use of the escutcheon connectors, one or two may be used, depending upon conditions, and I also contemplate using them with various distances of offset, depending upon the distance of non-alignment of the pipes and fixture, or the distance that the valve is to be set over to one side of the wall pipes.

While the invention is herein disclosed and illustrated as associated with a mixing valve, it is obvious that it may be employed in connection with any conventional plumbing fixture having the usual standard spaced inlet ports.

Having thus described my invention, what I claim and desire to secure by Letters Patent is:

1. A coupling for the purpose described comprising a bell shaped member with a centrally disposed interiorly threaded opening in the head thereof, a projection within the bell parallel with the axis of the opening, and a second interiorly threaded opening in said projection communicating with said opening in the head of the bell.

2. A pipe coupling for connecting a fixture to a pipe projecting through a hole in a wall, said coupling comprising a bell shaped member with a centrally disposed threaded opening in the head thereof and a projection in the skirt of the bell, said projection having a threaded opening therein communicating with the opening in said head, the pipe projecting from the wall adapted to extend into the opening within the skirt of the bell and said skirt adapted to conceal the opening in said wall.

In witness whereof, I hereunto subscribe my name this 24th day of April, 1926.

SAMUEL KERSTEN.